United States Patent [19]

Froix et al.

[11] 4,409,370
[45] Oct. 11, 1983

[54] THERMOPLASTIC BLEND OF OXYMETHYLENE COPOLYMERS EXHIBITING IMPROVED IMPACT RESISTANCE

[75] Inventors: Michael F. Froix, Menlo Park, Calif.; Rajal M. Kusumgar, North Plainfield, N.J.

[73] Assignee: Celanese Corporation, New York, N.Y.

[21] Appl. No.: 382,215

[22] Filed: May 26, 1982

Related U.S. Application Data

[63] Continuation of Ser. No. 165,535, Jul. 3, 1980, abandoned.

[51] Int. Cl.³ .......................................... C08L 59/04
[52] U.S. Cl. .................................. 525/414; 525/410; 525/472
[58] Field of Search ...................... 525/410, 414, 472

[56] References Cited

U.S. PATENT DOCUMENTS

| | | | |
|---|---|---|---|
| 3,485,799 | 12/1969 | Park | 525/414 |
| 3,519,696 | 7/1970 | Cherdron et al. | 525/414 |
| 3,795,715 | 3/1974 | Cherdron et al. | 528/250 |
| 3,848,021 | 11/1974 | Sextro et al. | 525/410 |

Primary Examiner—Wilbert J. Briggs, Sr.
Attorney, Agent, or Firm—Burns, Doane, Swecker & Mathis

[57] ABSTRACT

A polymer blend comprising a first copolymer and a second copolymer and having improved impact resistance is provided. The first copolymer has recurring units which consist essentially of oxymethylene groups having the formula —OCH$_2$—interspersed with

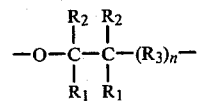

groups, where each R$_1$ and R$_2$ is selected from the group consisting of hydrogen, lower alkyl radicals, and halogen-substituted lower alkyl radicals, each R$_3$ is selected from the group consisting of methylene, oxymethylene, lower alkyl and haloalkyl substituted methylene, and lower alkyl and haloalkyl substituted oxymethylene radicals, and n is an integer from zero to three, each lower alkyl radical having one to two carbon atoms. The oxymethylene units comprise approximately 85 to approximately 99.9 mole percent of the recurring units of the first copolymer. The second copolymer has recurring units which consist essentially of oxymethylene groups having the formula—OCH$_2$—interspersed with

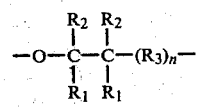

groups where R$_1$, R$_2$, R$_3$, and n have the same meanings as the corresponding symbols used with regard to the first copolymer and where the selections made with regard to the second copolymer are independent of the selections made with regard to the first copolymer, the oxymethylene groups of the second copolymer comprising approximately 50 to approximately 75 mole percent of the recurring units of the second copolymer. The second copolymer comprises approximately 1.5 to approximately 40 weight percent of the blend.

10 Claims, No Drawings

THERMOPLASTIC BLEND OF OXYMETHYLENE COPOLYMERS EXHIBITING IMPROVED IMPACT RESISTANCE

This application is a continuation of application Ser. No. 165,535, filed July 3, 1980 now abandoned.

BACKGROUND OF THE INVENTION

Polyoxymethylene polymers, having recurring units of the formula —$CH_2O$— have been known for many years. They may be prepared by the polymerization of anhydrous formaldehyde or by the polymerization of trioxane, which is a cyclic trimer of formaldehyde. Polyoxymethylene varies in thermal stability and in molecular weight, depending on its method of preparation.

Polyoxymethylene of high molecular weight and thermal stability is useful in the production of molded and extruded objects. A polyoxymethylene copolymer having improved resistance to thermal degradation is disclosed in commonly-assigned U.S. Pat. No. 3,027,352. This copolymer contains a major proportion (i.e., at least 85 percent) of oxymethylene units. This copolymer yields tough, heat-resistant, dimensionally stable molded products of high strength. The impact resistance is good, but for certain purposes (e.g., for automobile body and trim parts, such as fender parts, and for machine housings) an even higher resistance to impart is advantageous.

The addition of polyhydric alcohols such as glycerol or trimethylol propane or of readily volatile substances such as trioxane or 1,4-dioxane slightly increases the impact resistance of polyoxymethylenes but also involves a sharp reduction of rigidity and tensile strength. Basically the same applies to the addition of carboxamides. Furthermore, the above substances suffer from the added drawback that they can be washed out of the shaped articles or exude therefrom.

It has also been proposed to prepare thermoplastic molding compositions by blending polyoxymethylene with high molecular weight polyurethanes obtained from polyhydroxy compounds having molecular weights of from 500 to 4000, polyisocyanates and chain lengtheners. Here again, the rigidity and tensile strength suffer a strong reduction. Furthermore, the stability of the products is impaired, particularly as regards discoloration caused by thermal stresses and light.

Commonly-assigned U.S. Pat. No. 3,476,832 recommends the addition to oxymethylene polymers of butadiene/acrylonitrile copolymers, polyacrylates or copolymers of diolefins with alkylmethacrylates. However, these additives tend to reduce the thermal stability of the molding compositions and cause discoloration during processing.

U.S. Pat. No. 3,749,755 discloses thermoplastic molding compositions of improved impact resistance based on a mixture of an oxymethylene polymer and an elastomeric graft copolymer. The elastomeric graft copolymer comprises a prepolymer made from 10 to 99 percent by weight of an acrylic ester; 1 to 90 percent by weight of a diene; and, optionally, up to 25 percent by weight of at least one additional monomer. To the prepolymer is grafted styrene, methyl methacrylate, or mixtures thereof, and, optionally, acrylonitrile, methacrylonitrile, acrylic esters, vinyl esters, vinyl ethers, vinyl halides, or vinyl-substituted heterocyclic compounds.

U.S. Pat. No. 3,975,459 discloses thermoplastic molding compositions of high impact resistance based on polyoxymethylenes and block copolymers of a diene polymer block and at least one poly (alkylmethacrylate) block.

U.S. Pat. No. 4,181,685 discloses thermoplastic molding compositions in which the crystalline structure of oxymethylene polymers is modified by the addition of branched or cross-linked polyoxymethylenes as nucleating agents. The branched or cross-linked polyoxymethylenes include multifunctional reactive compounds. The compositions are not disclosed as having any beneficial effect upon the impact strength of the oxymethylene polymers.

Thus, it is an object of the present invention to provide a blend of oxymethylene copolymers having improved impact resistance.

It is also an object of the present invention to provide a blend of oxymethylene copolymers which exhibits improved impact resistance with no significant reduction in tensile and flexural properties.

It is also an object of the present invention to provide a blend of oxymethylene copolymers which exhibits improved impact resistance, toughness, and flexibility.

These and other objects as well as the scope, nature, and utilization of the present invention will be apparent from the following description and appended claims.

SUMMARY OF THE INVENTION

The present invention provides a polymer blend having improved impact resistance comprising:

(A) a first copolymer whose recurring units consist essentially of (i) oxymethylene groups having the formula —$OCH_2$— interspersed with

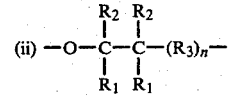

groups, where each $R_1$ and $R_2$ is selected from the group consisting of hydrogen, lower alkyl radicals, and halogen-substituted lower alkyl radicals, each $R_3$ is selected from the group consisting of methylene, oxymethylene, lower alkyl and haloalkyl substituted methylene, and lower alkyl and haloalkyl substituted oxymethylene radicals, and n is an integer from zero to three, each lower alkyl radical having one to two carbon atoms, the oxymethylene units of the first copolymer comprising approximately 85 to approximately 99.9 mole percent of the recurring units of the first copolymer, the (ii) units of the first copolymer being incorporated during the step of copolymerization to produce the first copolymer by the opening of the ring of a cyclic ether having adjacent carbon atoms by the breaking of an oxygen-to-carbon linkage, and (B) a second copolymer whose recurring units consist essentially of (i) oxymethylene groups having the formula —$OCH_2$— interspersed with

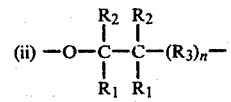

groups where $R_1$, $R_2$, $R_3$, and n have the same meaning as the corresponding symbols used with regard to the first copolymer and where the selections made with regard to the second copolymer are independent of the selections made with regard to the first copolymer, the oxymethylene groups of the second copolymer comprising approximately 50 to approximately 75 mole percent of the recurring units of the second copolymer, wherein the second copolymer comprises approximately 1.5 to approximately 40 weight percent of the blend.

DETAILED DESCRIPTION OF THE INVENTION

The present invention provides a blend of oxymethylene copolymers having improved impact resistance. As used herein, the term "blend" includes any physical blend, mixture, or alloy of the polymeric components.

The first component of the blend of the present invention is the oxymethylene copolymer disclosed is U.S. Pat. No. 3,027,352, the disclosure of which is herein incorporated by reference. This copolymer is available commercially under the trademark Celcon® from the Celanese Corporation.

The first component copolymer consists essentially of (i) oxymethylene groups having the formula —OCH$_2$— interspersed with (ii) groups having the formula

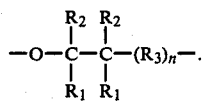

Each $R_1$ and $R_2$ is selected from the group consisting of hydrogen, lower alkyl radicals, and halogen-substituted lower alkyl radicals. Each $R_3$ is selected from the group consisting of methylene, oxymethylene, lower alkyl and haloalkyl substituted methylene, and lower alkyl and haloalkyl substituted oxymethylene radicals. Each lower alkyl radical contains one to two carbon atoms, and n is an integer from zero to three. The oxymethylene units of the first component copolymer comprise approximately 85 to approximately 99.9 mole percent of the recurring units of the first copolymer, and the (ii) units of the first component compolymer comprise approximately 0.1 to 15 mole percent of the recurring units of the first copolymer. The (ii) units of said first copolymer are incorporated during the step of copolymerization to produce the first component copolymer by the opening of the ring of a cyclic ether having adjacent carbon atoms by the breaking of an oxygen-to-carbon linkage.

The first component copolymer may be prepared by polymerizing trioxane together with from about 0.1 to about 15 mole percent of a cyclic ether having at least two adjacent carbon atoms, preferably in the presence of a catalyst comprising a boron fluoride coordinate complex in which oxygen or sulfur is the donor atom.

In general, the cyclic ethers which may be used are of the formula

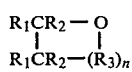

wherein each $R_1$ and $R_2$ is selected from the group consisting of hydrogen, lower alkyl and lower halogen substituted alkyl radicals and each $R_3$ is selected from the group consisting of methylene, oxymethylene, lower alkyl and haloalkyl substituted methylene and lower alkyl and haloalkyl substituted oxymethylene radicals and n is an integer from zero to three.

The preferred cyclic ethers used in the preparation of the desired copolymers are ethylene oxide and 1,3-dioxolane which may be designated by the formula

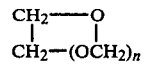

where n is zero or one. Other cyclic ethers which may be used are 1,4-dioxane, trimethylene oxide, tetramethylene oxide, pentamethylene oxide, 1,2-propylene oxide, 1,2-butylene oxide, 1,3-butylene oxide and 2,2-di(chloromethyl)-1,3-propylene oxide.

Further details concerning the preparation of the first component copolymer may be obtained from the disclosure of U.S. Pat. No. 3,027,352, which has been incorporated herein by reference.

The first component copolymer is normally solid, having a melting point not less than approximately 150° C. The first component copolymer preferably has a melting point within the range of approximately 160° C. to 180° C., and most preferably of approximately 170° C.

The first component copolymer commonly exhibits an intrinsic viscosity of no less than approximately 1.0 dl./g., and preferably of approximately 1.4 to 2.0 dl./g. The intrinsic viscosity is measured at a concentration of 0.1 percent by weight using parachlorophenol as a solvent at a temperature of 60° C.

The second component of the blend of the present invention is a copolymer whose recurring units consist essentially of (i) oxymethylene groups having the formula —OCH$_2$— interspersed with

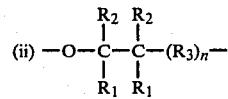

groups where $R_1$, $R_2$, $R_3$, and n have the same meanings as the corresponding symbols used with regard to the first component copolymer and where the selections made with regard to the second component copolymer are independent of the selections made with regard to the first component copolymer. The oxymethylene groups of the second copolymer comprise approximately 50 to approximately 75 mole percent of the recurring units of the second copolymer, preferably approximately 65 to 75 mole percent, and most preferably approximately 70 mole percent. The (ii) groups of the second copolymer comprise approximately 25 to 50 mole percent of the recurring units of the second copolymer, preferably approximately 25 to 35 mole percent and most preferably approximately 30 mole percent.

The second component copolymer may be prepared by polymerizing trioxane together with a cyclic ether having at least two adjacent carbon atoms. The preferred cyclic ether is 1,3-dioxolane. Other cyclic ethers which may be used are 1,4-dioxane, ethylene oxide, trimethylene oxide, tetramethylene oxide, pentamethylene oxide, 1,2-propylene oxide, 1,2-butylene oxide, 1,3- butylene oxide, and 2,2-di(chloromethyl)-1,3-propylene oxide.

The second component copolymer can be either a random or block copolymer and can be formed by cationic polymerization, using a Lewis acid catalyst, such as boron fluoride coordinate complexes, or by anionic polymerization, using alkylamine, aromatic phosphine, or metal alcoholate catalysts. The second component copolymer is commonly prepared in the same manner as the first component copolymer, as described in U.S. Pat. No. 3,027,352.

The second copolymer exhibits a melting point within the range of approximately 40° C. to 80° C., preferably of approximately 50° C. to 70° C., and most preferably of approximately 70° C.

The second component copolymer commonly exhibits an intrinsic viscosity of no less than approximately 2.0 dl./g., and preferably of approximately 2.2 to 3.5 dl./g. The intrinsic viscosity is measured at a concentration of 0.1 percent by weight using parachlorophenol as a solvent at a temperature of 60° C.

The blend of the present invention comprises approximately 1.5 to 40 weight percent of the second component copolymer. Preferably, the blend comprises approximately 1.5 to 20 weight percent (e.g., approximately 1.5 to 10 weight percent) of the second component copolymer. The above weight percentages are based upon the total weight of the first and second component copolymers.

In preparing the blend of the present invention, the individual components are commonly provided in the form of chips or pellets. Each of the components is weighed separately, and then the components are physically mixed in any appropriate apparatus, e.g., a ball mill. The components are then blended together in the melt in any mixing device which allows mixing in the melt. A device which conveniently may be used for this purpose is a twin screw extruder. The extrusion apparatus thoroughly mixes the polymers in the melt and then extrudes the blend in the form of a strand which, upon solidification, can be broken up into chips or pellets.

As previously discussed, it is known in the art that blends containing an oxymethylene copolymer which exhibit improved impact resistance often also exhibit a significant reduction in other properties, such as tensile strength. However, unexpected and surprising results are achieved with the blend of the present invention. It has been observed that there is no significant reduction in tensile and flexural properties, while there is dramatic improvement in such properties as impact strength, flexibility (elongation), and toughness (work to break).

The blend of the present invention is capable of undergoing melt processing at a temperature within the range of approximately 150° C. to 230° C. Preferably, the blend is capable of undergoing melt processing at a temperature within the range of approximately 160° C. to 200° C.

The blend of the present invention is useful as a molding resin, and especially for injection molding. The blend can also be used in the formation of sheet, film, rods, bars, profiles, fibers, etc.

Articles may also be molded from a molding compound which includes, as one component, the blend of the present invention. Such a molding compound incorporates into the blend of the present invention approximately 5 to 50 percent, preferably approximately 10 to 40 percent by weight, based upon the total weight of the molding compound, of a solid filler and/or reinforcing agent. Representative fibers which may serve as reinforcing media include glass fibers, asbestos, graphitic carbon fibers, amorphous carbon fibers, synthetic polymeric fibers, aluminum fibers, aluminum silicate fibers, oxide of aluminum fibers, titanium fibers, magnesium fibers, rock wool fibers, steel fibers, tungsten fibers, cotton wool, and wood cellulose fibers, etc. Representative filler materials include calcium silicate, silica, clays, talc, mica, polytetrafluoroethylene, graphite, alumina trihydrate, sodium aluminum carbonate, barium ferrite, etc.

In order to form an article by injection molding from the present blend, or from a molding compound made from the present blend, the blend or molding compound is brought to the melt temperature of the blend, e.g., approximately 180° C. to 220° C., and is then injected into a mold cavity. The mold cavity is commonly maintained at a temperature of approximately 80° C. to 100° C. The blend in its melt phase is injected into the mold cavity at a pressure of approximately 10,000 p.s.i. The cycle time (i.e., the time between injections) for the present blend is approximately 35 seconds.

Articles formed from the blend of the present invention exhibit all the advantages of articles formed from the copolymer of U.S. Pat. No. 3,027,352, with the additional advantages of improved impact strength and toughness. Thus, articles formed from the blend of the present invention are available for use in a widened field of application where more demanding conditions are encountered.

The following Example is given as a specific illustration of the invention. It is to be understood, however, that the invention is not limited to the specific details set forth in the Example.

EXAMPLE

Blend compositions were prepared by the melt extrusion of two oxymethylene copolymers. The first component copolymer is available commercially from the Celanese Corporation under the trademark Celcon®. The particular designation of the copolymer used is M90-04. This copolymer is an oxymethylene/ethylene oxide copolymer in which the oxymethylene groups comprise approximately 98 mole percent of the recurring units of the copolymer. This first component copolymer exhibited a melting point of 170° C. and an inherent viscosity of 1.4 dl./g. The second component copolymer was an oxymethyene/dioxolane copolymer in which the oxymethylene groups comprised approximately 70 mole percent of the recurring units of the copolymer. This second component copolymer exhibited a melting point of 70° C. and an intrinsic viscosity of 2.16 dl./g. The second component copolymer was incorporated into the blend compositions in weight percentages of 1.5, 3, 5, 10, 20, and 30 percent.

The component polymers, in the form of solid particles, such as chips or pellets, were weighed separately and were subsequently physically mixed together. The mixture of solid particles was then heated until a melt phase was formed, and the melt was thoroughly mixed in a twin screw melt extrusion apparatus. The resulting blend was extruded into the form of a strand, which, upon solidification, was broken up into solid particles of the polymer blend.

In order to measure the mechanical properties of the blend, shaped articles were molded from the polymer blends. The solid particles of the various compositions were heated to the melt temperature of the blend (approximately 180° C.), and were subsequently injected into a mold cavity at an injection pressure of approximately 10,000 p.s.i. The mold cavity was held at a temperature of approximately 80° C. The cycle time for the injection molding process was approximately 35 seconds.

The mechanical properties of the blend were measured and are shown in Table I.

TABLE I

| Blend Composition (A:B)* | Notched Impact Strength (ft.-lbs.) | Unnotched Impact Strength (ft.-lbs.) | Tensile Impact Strength (ft.-lbs.) | Elongation (%) | Work To Break (in.-lbs.) | Tensile Strength (p.s.i.) | Flexural Strength (p.s.i.) |
|---|---|---|---|---|---|---|---|
| 100:0 | 0.69 | 28.8 | 95 | 70 | 26 | 8450 | 11300 |
| 98.5:1.5 | 1.40 | 28.2 | 121 | 87 | 40 | 8590 | 10800 |
| 97:3 | 1.40 | 32.5 | 143 | 107 | 38 | 8290 | 10500 |
| 95:5 | 1.48 | 41.0 | 143 | 140 | 45 | 8040 | 9940 |
| 90:10 | 1.65 | No Break | 174 | 172 | 52 | 7400 | 8870 |
| 80:20 | 1.80 | No Break | — | — | — | 5910 | 7090 |
| 70:30 | 2.70 | No Break | — | — | — | 4790 | 5660 |

*A = first component copolymer (Celcon ®)
B = second component copolymer

The notched and unnotched impact strengths were determined in accordance with standard test ASTM D256; the tensile impact strength was determined in accordance with ASTM D1822; the tensile properties (elongation, work to break, and tensile strength) were determined in accordance with ASTM D638; the flexural strength was determined in accordance with ASTM D790.

The data clearly show the dramatic improvement in impact strength, flexibility, and toughness provided by the blend of the present invention. It can also clearly be seen that there is no significant reduction in tensile and flexural strengths, especially for compositions containing 10 weight percent or less of the second component copolymer.

It is to be understood that the foregoing detailed description is given merely by way of illustration and that many variations may be made therein without departing from the spirit of the invention.

We claim:

1. A polymer blend having improved impact resistance comprising:
(A) a first copolymer whose recurring units consist essentially of
(i) oxymethylene groups having the formula —OCH$_2$— interspersed with

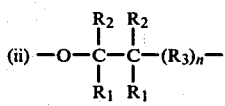

groups, where each R$_1$ and R$_2$ is selected from the group consisting of hydrogen, lower alkyl radicals, and halogen-substituted lower alkyl radicals, each R$_3$ is selected from the group consisting of methylene, oxymethylene, lower alkyl and haloalkyl substituted methylene, and lower alkyl and haloalkyl substituted oxymethylene radicals, and n is an integer from zero to three, each lower alkyl radical having one to two carbon atoms, said oxymethylene units of said first copolymer comprising approximately 85 to approximately 99.9 mole percent of the recurring units of said first copolymer, said (ii) groups of said first copolymer being incorporated during the step of copolymerization to produce said first copolymer by the opening of the ring of a cyclic ether having adjacent carbon atoms by the breaking of an oxygen-to-carbon linkage, and
(B) a second copolymer whose randomly recurring units consist of
(i) oxymethylene groups having the formula —OCH$_2$— interspersed with

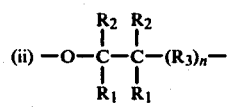

groups, where R$_1$, R$_2$, R$_3$ and n have the same meanings as the corresponding symbols used with regard to said first copolymer and where the selections made with regard to said second copolymer are independent of the selections made with regard to said first copolymer, said oxymethylene groups of said second copolymer comprising approximately 65 to approximately 75 mole percent of the randomly recurring units of said second copolymer, said (ii) groups of said second polymer comprising approximately 25 to approximately 35 mole percent of the randomly recurring units of the second copolymer and being randomly incorporated during the step of copolymerization to produce said second copolymer by the opening of the ring of a cyclic ether having adjacent carbon atoms by the breaking of an oxygen-to-carbon linkage, wherein said second copolymer comprises approximately 1.5 to approximately 40 weight percent of said blend, said blend having an impact resistance greater than that of said first copolymer.

2. The polymer blend of claim 1 wherein said first copolymer comprises the reaction product of trioxane with from approximately 0.1 to approximately 15 mole percent of a cyclic ether having at least two adjacent carbon atoms.

3. The polymer blend of claim 2 wherein said cyclic ether comprises 1,3-dioxolane.

4. The polymer blend of claim 1 wherein said cyclic ether comprises ethylene oxide.

5. The polymer blend of claim 4 wherein said second copolymer comprises approximately 1.5 to approximately 10 weight percent of said blend and consists essentially of oxymethylene groups interspersed with groups formed from dioxolane.

6. The polymer blend of claim 1 wherein said second copolymer comprises the reaction product of trioxane with from approximately 25 to approximately 35 mole percent of a cyclic ether having at least two adjacent carbon atoms.

7. The polymer blend of claim 1 wherein said second copolymer exhibits a melting point of approximately 70° C.

8. The polymer blend of claim 1 wherein said second copolymer exhibits an intrinsic viscosity of no less than approximately 2.0 dl/g.

9. A molded article comprising the polymer blend of claim 1.

10. An extruded article comprising the polymer blend of claim 1.

* * * * *